United States Patent [19]
Brown

[11] Patent Number: 5,579,244
[45] Date of Patent: Nov. 26, 1996

[54] PRESSURE CONTROLLER

[75] Inventor: Roderick G. Brown, Nottingham, United Kingdom

[73] Assignee: Druck Limited, United Kingdom

[21] Appl. No.: 429,232

[22] Filed: Apr. 25, 1995

[30] Foreign Application Priority Data

Nov. 2, 1994 [GB] United Kingdom ............... 9422139

[51] Int. Cl.$^6$ ........................................... G01N 7/00
[52] U.S. Cl. ................................... 364/558; 123/571
[58] Field of Search ................... 364/510, 424.1, 364/558; 123/571

[56] References Cited

U.S. PATENT DOCUMENTS

| | | | |
|---|---|---|---|
| 4,233,947 | 11/1980 | Abo | 123/571 |
| 4,241,750 | 12/1980 | Furuse et al. | 137/101.19 |
| 4,539,967 | 9/1985 | Nakajima et al. | 123/585 |
| 4,566,868 | 1/1986 | Menzies | 417/572 |
| 4,587,883 | 5/1986 | Ehrentraut et al. | 91/363 R |
| 4,766,921 | 8/1988 | Williams | 137/1 |
| 4,961,441 | 10/1990 | Salter | 137/14 |
| 4,974,622 | 12/1990 | Rader | 137/1 |
| 5,020,564 | 6/1991 | Thomas et al. | 137/102 |
| 5,062,050 | 10/1991 | Petzold et al. | 364/424.1 |
| 5,134,961 | 8/1992 | Giles et al. | 118/684 |
| 5,142,483 | 9/1992 | Basham et al. | 364/510 |
| 5,285,791 | 2/1994 | Smith | 128/677 |
| 5,404,871 | 4/1995 | Goodman et al. | 128/200.14 |
| 5,423,738 | 6/1995 | Robinson et al. | 604/4 |
| 5,434,779 | 7/1995 | Vukovich et al. | 364/424.1 |
| 5,460,196 | 10/1995 | Yonnet | 137/12 |

FOREIGN PATENT DOCUMENTS

WO91/00562  1/1991  WIPO .

OTHER PUBLICATIONS

EP 95 307760 dated, Jan. 25, 1996, European Search Report.
UK Search Report dated Feb. 22, 1995 for Priority Application No. GB 9422139.7.

Primary Examiner—Emanuel T. Voeltz
Assistant Examiner—Demetra R. Smith
Attorney, Agent, or Firm—Dechert Price & Rhoads

[57] ABSTRACT

A pressure controller of the type using pulse width modulated apply and release solenoid valves (80, 82) connected to an outlet port (74) of the controller overcomes the technical problem of poor control stability by using a digital control loop (98, 100, 76, 78) which utilizes stored bias characteristics representing the variation with pressure of the value ($n_o$) of the pulse width modulation signal at which each valve initiates flow ($n_o$). These values are determined in a characterisation step conducted with the controller off-line. The values may be modified during on-line operation of the controller by monitoring the stability of the controller or other signals representing the opening and closing of the valves.

13 Claims, 8 Drawing Sheets

PRESSURE CONTROLLER

The present invention relates to pressure controllers of the type used to maintain a highly stable pneumatic pressure at an outlet port.

Such instruments have many applications, including testing of components and the calibration of pressure transducers, indicators and instruments, such as altimeters and depth or level sensors which rely on pressure measurements.

The controller is used together with a source of gas under pressure, typically pressurized air. The source is usually external but where the controller is to be used as part of a portable instrument, such as an air data test set, the source may be integrated with the controller. Although the source will be under pressure, that pressure is not necessarily stable. However, the controller must be capable of producing at the output a stable pressure as set by the user of the controller.

Existing pressure controllers either use mechanical systems or, as in the case of controllers manufactured by the applicant, Druck Limited, by Ruska Inc. and by Mensor Inc., use pulse width modulated apply and release solenoid valves as the pressure control actuators. Such valves are relatively cheap and widely available for a wide range of operating pressures. The technique of using solenoid valves depends upon an appreciation that, when the solenoid valve is energized by a pulsed voltage, the valve will operate in the manner of a proportional valve opening controllably between the fully closed and fully opened states, the flow depending upon the width of the pulses applied to the solenoid.

FIG. 1 illustrates a cross section through such a solenoid valve 1 showing the relative arrangement of the core 2 of the valve 1 which is moved towards and away from an orifice 8. The core or plunger 2 is biased by a return spring 4 so that a compliant valve seat 6 on one face of the core 2 is positioned over an orifice 8 defined within a wall 10 of pressure containment enclosure 12. The wall 10 separates a fluid inlet 14 from a fluid outlet 16 of the pressure enclosure 12. An electromagnet 18 surrounds the pressure enclosure 12 and the core 2 and can be energized by means of a power signal applied to a solenoid coil of the electromagnet 18. When the electromagnet 18 is energized its field passes through the pressure enclosure 12 and acts on the core 2 moving the core 2 against the force of the return spring 4 to open the orifice 8 and allow gas to flow from the inlet 14 to the outlet 16. This is the normal mode of operation of such a solenoid valve.

However it is also possible to throttle the solenoid valve 1 so as to control the flow through the orifice 8. This can be done by applying a pulse width modulated signal, with a frequency which is determined by the valve dynamics, to the electromagnet 18. Typical such signals are illustrated in FIGS. 2A and 2B. In FIG. 2A, the start of a first pulse 17 of a first signal 9 is indicated by a first pulse line 19. The completion of a pulse is indicated by a first pulse line 20. In FIG. 2A the first pulse width 21 is 15% of the first period 23 of the first signal 9. In the context of this specification, this will be referred to as a 15% pulse width modulation signal or as a 15% duty cycle.

In FIG. 2B, the start of a second pulse 24 of a second signal 11 is indicated by a second pulse line 25. The completion of the second pulse 24 is indicated by the second pulse line 22. In FIG. 2B the second pulse width 27 is 50% of the second period 26 of the second signal 11. The second signal 11 will be referred to as a 50% pulse width modulated signal or as a 50% duty cycle.

When a low value pulse width modulation signal is applied by a power source 24 to the electromagnet 18 of the solenoid valve 1, it is found that the vibration induced between the seat 6 and the orifice 8 permits a gradual leakage of gas from the inlet 14 to the outlet 16 of the valve.

For a limited range of pulse width modulation signals, a solenoid valve will display a repeatable and proportional relationship between the flow of gas through the valve and the percentage value of the pulse width modulation signal used to energize its electromagnet. The maximum flow, when the valve is in the fully open state, will be governed by the size of the orifice.

The fundamental transfer characteristic of a typical solenoid valve is illustrated in FIG. 3 which shows flow plotted on the horizontal axis as against the percentage value of a pulse width modulation signal applied to the solenoid. (In the Figure, the percentage of the pulse width modulation signal is referred to as "% Duty Cycle.") It will be noted that the flow is zero for low percentage values of pulse width modulation. At some minimum of percent pulse modulation, $n_o$, fluid flow through the valve is initiated. The exact value of no is found to vary between individual valves and with differential pressure, temperature, energization voltage frequency and time. The region between zero and $n_o$ is referred to in this specification as the "dead band". Typically flow across a valve will have started before a pulse width modulation signal of say 15% and the flow will be relatively linear, as shown in the region of the plot highlighted by the circle 30 in FIG. 3. The upper and lower working limits n and N of highlighted circle 30 are typically about 15% and 30% pulse width modulation, respectively. After the linear portion 30, the flow increases steeply until the percent pulse width modulation reaches a value of $N_o$, at which the speed of the fluid flowing through the orifice 8 approaches the speed of sound.

It is found that the extent of the linear portion of the transfer characteristic is a function of the frequency of the pulse width modulation signal. FIG. 4 shows the envelope of the transfer characteristics plotted against frequency. Curve 40 shows how the value $N_o$ at which the valve is fully open varies with frequency. Curve 42 shows how the value $n_o$, at which the valve starts to open and permit flow, varies with frequency. In order to achieve maximum control, it is desirable to have a wide separation between the fully open and fully closed positions such as is available with lower frequency signals. However, in order to ensure an acceptable response time of the controller, it is necessary to use a higher frequency. Thus, the range between $n_o$ and $N_o$ will generally be somewhat less than the maximum achievable range.

Existing designs of pressure controllers have used a standard analogue feedback loop in which a voltage signal representing a set point or pressure value selected by the user is compared with a voltage signal which represents a pressure at the output of the controller as measured by a pressure transducer, in an error amplifier. The output error signal from the error amplifier is then used to increase or decrease the value of the pulse width modulation signal applied to apply and release solenoid valves both operating in the range between $n_o$ and $N_o$ where they act as proportional valves. The controllers generally have three ports. The source port feeds fluid of relatively higher pressure into the controller. The vent port releases fluid from the controller to relieve pressure. Finally, the outlet port couples the controller to the pressurized body in which the pressure is to be controlled. The apply valve is connected between the source of high pressure fluid and the source port of the controller, whereas the release valve is connected between the vent port and either the ambient atmosphere or some other atmosphere of lower pressure than the set pressure of the controller. The output port of the controller is connected to the pressure transducer which produces an analogue voltage representing the actual pressure. A silicon strain gauge pressure transducer may be used for this purpose, or any other type of transducer having suitable accuracy and band width.

Pressure controllers based on analogue feedback loops include the DP1500 model manufactured by Druck Limited, the present applicant. In order to alleviate the problem of stability associated with this type of design, various methods have been employed. Stability problems arise from:

offset and gain drifts in the analogue signal processing non-linearity in the output of the pressure transducer changes in the output of the pressure transducer which can be temperature dependent Problems of temperature variation and linearity in the pressure transducer have been solved to some extent by measuring the characteristics of the pressure transducer at manufacture time and calculating the necessary correction factor which can be stored in a memory and used by a microprocessor to adjust the value of the set point for any particular pressure selected by the user. This introduces an outer digital feedback control loop which has a much slower response, perhaps 20 seconds, compared with a 1 second response time of the analogue control loop. This is the basis of existing pressure controllers such as the model DPI510. This instrument requires skill in order to set up the best single bias point of the apply and release valve for the working pressure range so that the output pressure is as stable as possible. The "bias point" is the basal value of the % pulse width modulation used to control a valve. This basal value is the value that is adjusted by the feedback loop. Appropriate stabilization will not happen if the bias point is set within the dead band. This controller is limited to using the same bias point value for both apply and release valves, which can lead to problems, as discussed below.

A further problem arises when the valve bias point is set too high, in which case gas can continually flow through both valves. Although this continuous flow does not necessarily affect the accuracy of the pressure at the outlet port of the controller, it does produce a waste of source gas and results in the controller being relatively noisy.

Where the valves are under or over biased it is also possible for instabilities to be generated as the outlet pressure oscillates around the set point. These instabilities may be initiated because of a small fluctuation in flow which may be caused by rotation of the core so that momentarily a larger or smaller flow of gas occurs across the valve than anticipated. This means that this type of pressure controller is only capable of producing a pressure stability of about 50 parts per million (ppm). Although this level of stability is acceptable for many applications, it is not as great as can be achieved with alternative technologies such as mechanical flapper valves' which achieve pressure stability of, for example, 20 ppm.

The object of the present invention is therefore to achieve a greater stability preferably 10 ppm or better, whilst using the relatively economical technique of paired apply and release solenoid valves.

SUMMARY OF THE INVENTION

The pressure controller of the present invention relies upon a better understanding of the relevance of the dead band and the pressure and other dependencies of the value of $n_o$. The dependence of $n_o$ on the differential pressure across a valve is referred to in this specification as the bias characteristic. Although manifest in the designs of existing pressure controllers using such techniques, the bias characteristics of the valves were not previously exploited.

The controller of the present invention comprises means for the off-line characterisation of the $n_o$ value for all working differential pressures and for each of the apply and release valves independently.

The technique of off-line characterisation of the valves to calibrate the controller can be carried out automatically and the results stored in a microprocessor in order to set the initial bias point of the valve at a pre-determined level which is dependent upon the pressure set by the user. An advantage of the controller is that it can be constructed as a digital instrument with a single digital feedback loop thereby eliminating problems associated with drift in the analogue circuits.

Further increases in accuracy and stability of the pressure controller of the present invention may be obtained by the use, in preferred embodiments of the controller, of on-line characterisation of the valves to correct the particular values of the bias characteristic for pressures generated by the controller itself so that when the same pressure is required again, any bias characteristic drift which may have occurred since the last off-line calibration can be immediately compensated, resulting in higher long term output pressure stability.

BRIEF DESCRIPTION OF THE DRAWINGS

In order that the invention may be well understood an embodiment thereof will now be described, by way of example only, with reference to the accompanying drawings, in which.

DESCRIPTION OF THE PARTICULAR EMBODIMENTS

In the prior art discussion reference has been made to the use of solenoid valves as the apply and release valves of a pressure controller. However, it will be appreciated that these valves may alternatively be any type of valve that would normally be controlled in an on/off fashion by actuation means other than solenoids but which can be controlled to permit restricted leakage across the valve seat by means of a pulse-width modulated signal. Examples of such valves include, among other things, magnetically operated reed valves and piezoelectric actuated valves.

Figure 8:
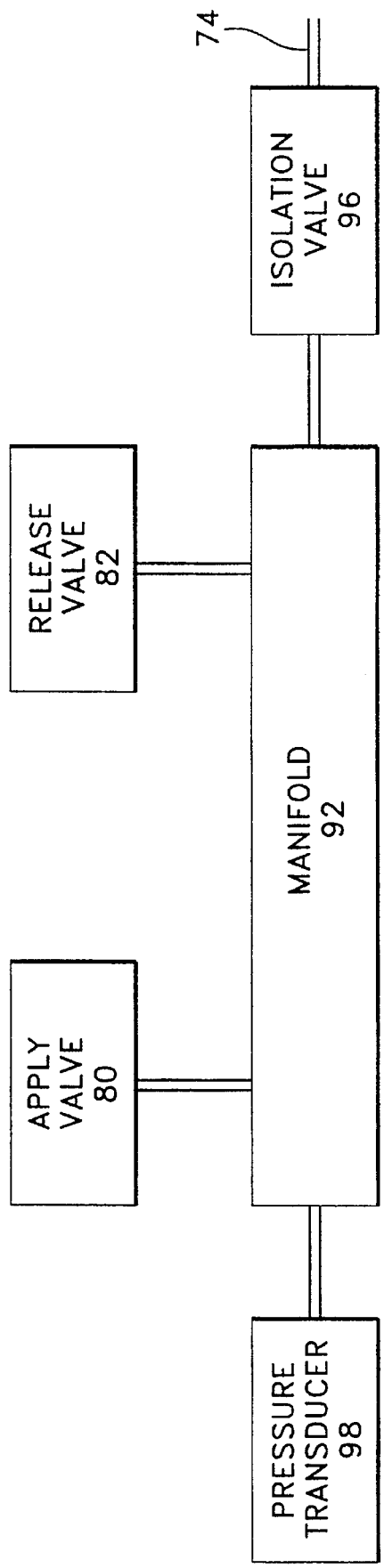
FIG. 8 shows the arrangement of the apply and release valves in the pressure controller of FIG. 7 when they are connected for use in the off-line characterisation mode of operation of the pressure controller.

A significant factor which affects the value of $n_o$ is the output pressure which the controller is set to generate. It has been discovered that the relationship between $n_o$ and the differential pressure across the valve is substantially linear. Accordingly, a calibration process in which the value of $n_o$ is measured for a predetermined number of pressures across the range of the controller will allow, with the use of a suitable algorithm within a microprocessor, prediction of the value of $n_o$ for any pressure within the range which may be set by the user. As will described with reference to FIG. 8, the off-line calibration of the valves can therefore be automated so that it requires no skill. In this way, the calibration process can be repeated periodically in the field, with the pressure controller off-line to restore the stability of the controller. This is a significant advantage of the controller of the present invention.

It is differential pressure across the valve which affects the value of $n_o$. It is therefore necessary either to measure source pressure or prescribe the source pressure with which the controller should be used. It will be noted that the differential pressure across the apply and release valves is not the same for any particular output pressure, with the exception of the one instance where the output pressure selected by the user is mid-way between the source and vent pressures. For this reason, the bias point measurements on the apply and release valves are to be measured independently during the characterisation step.

The characteristics of solenoid valves have already been described in the introduction to this specification with reference to FIGS. 1 to 4.

Figure 1:
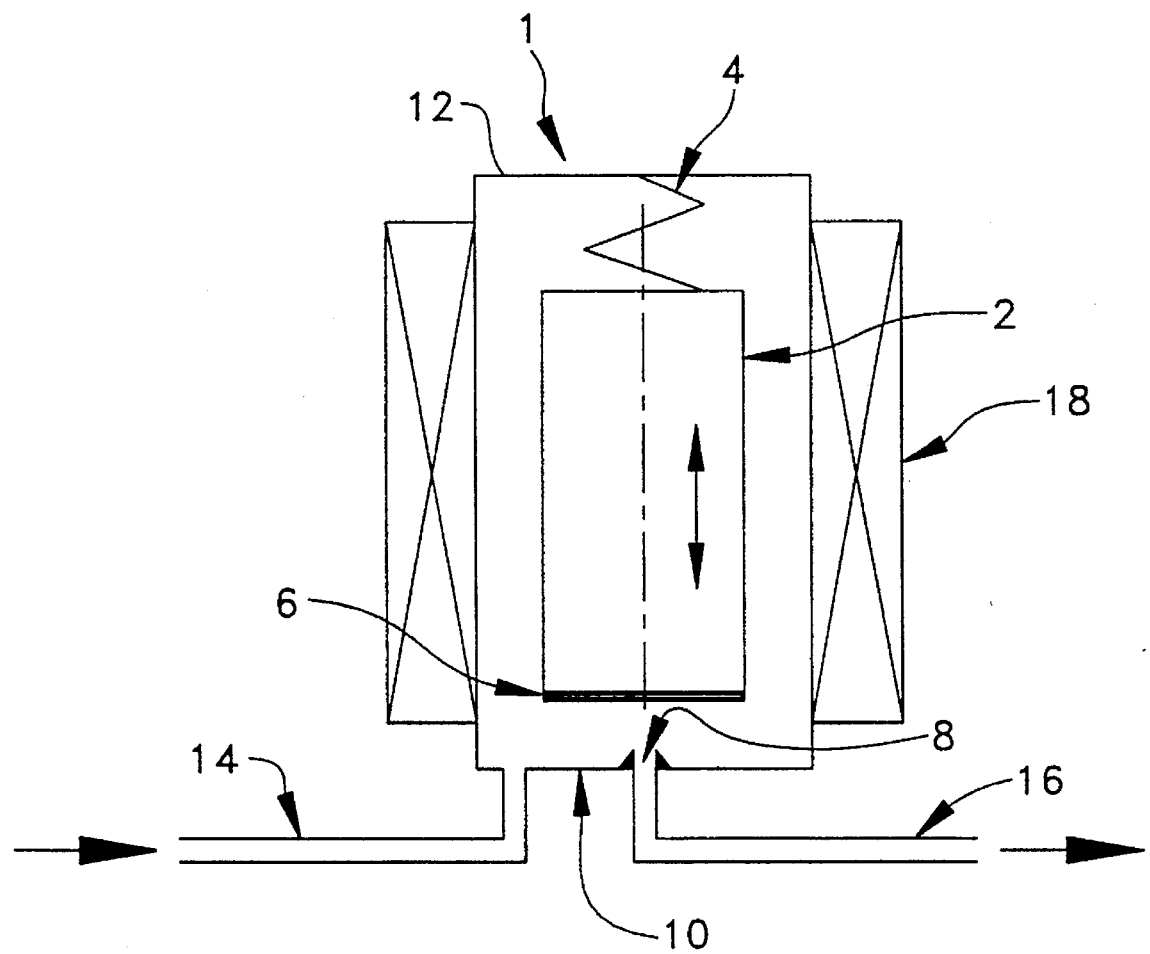
FIG. 1 is a diagrammatic cross-section through a solenoid valve.
Figure 2:
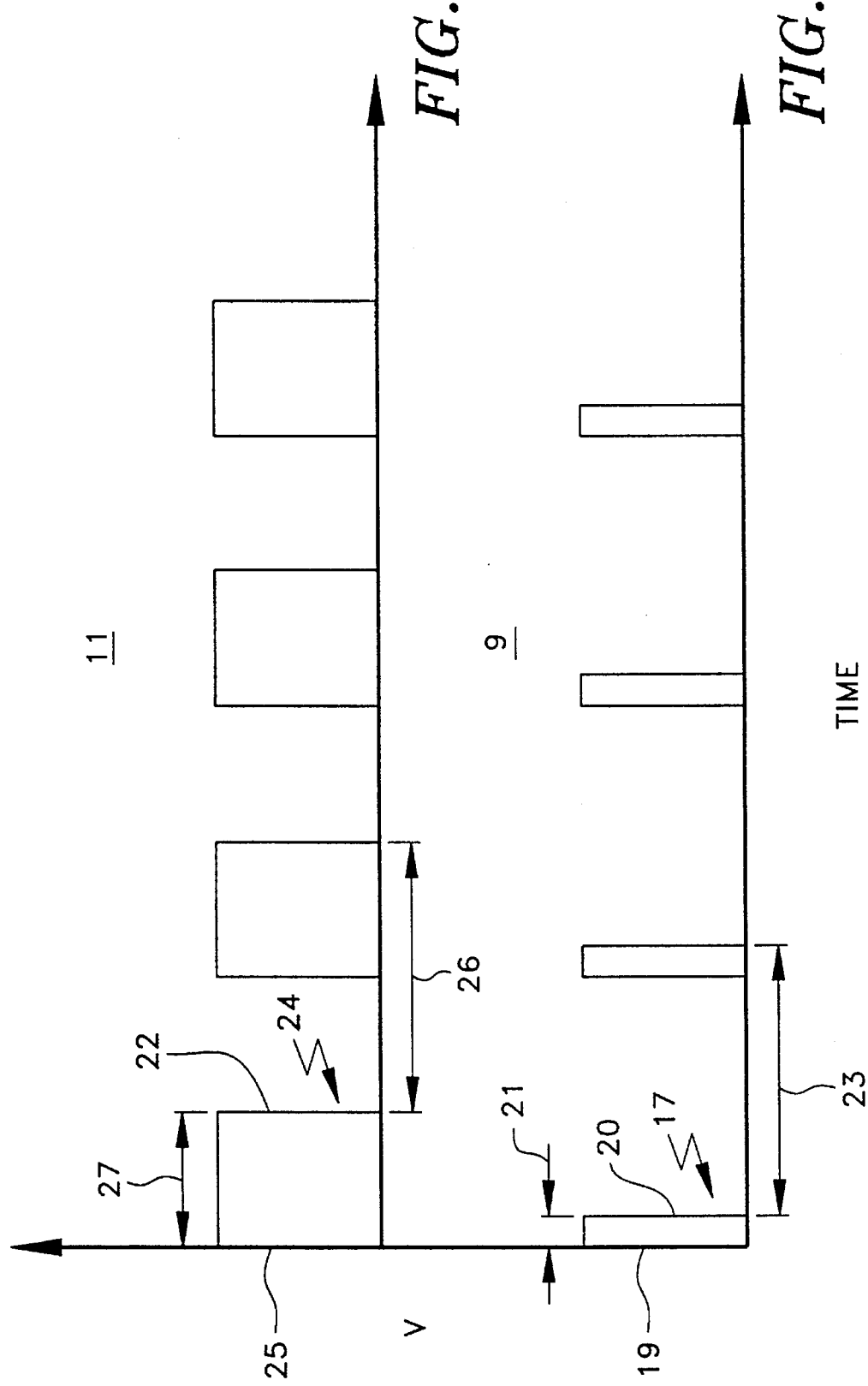
FIG. 2 shows two different pulse width modulation signals, FIG. 2A representing a 50% pulse width modulation signal, and FIG. 2B representing a 15% pulse modulation signal.
Figure 3:
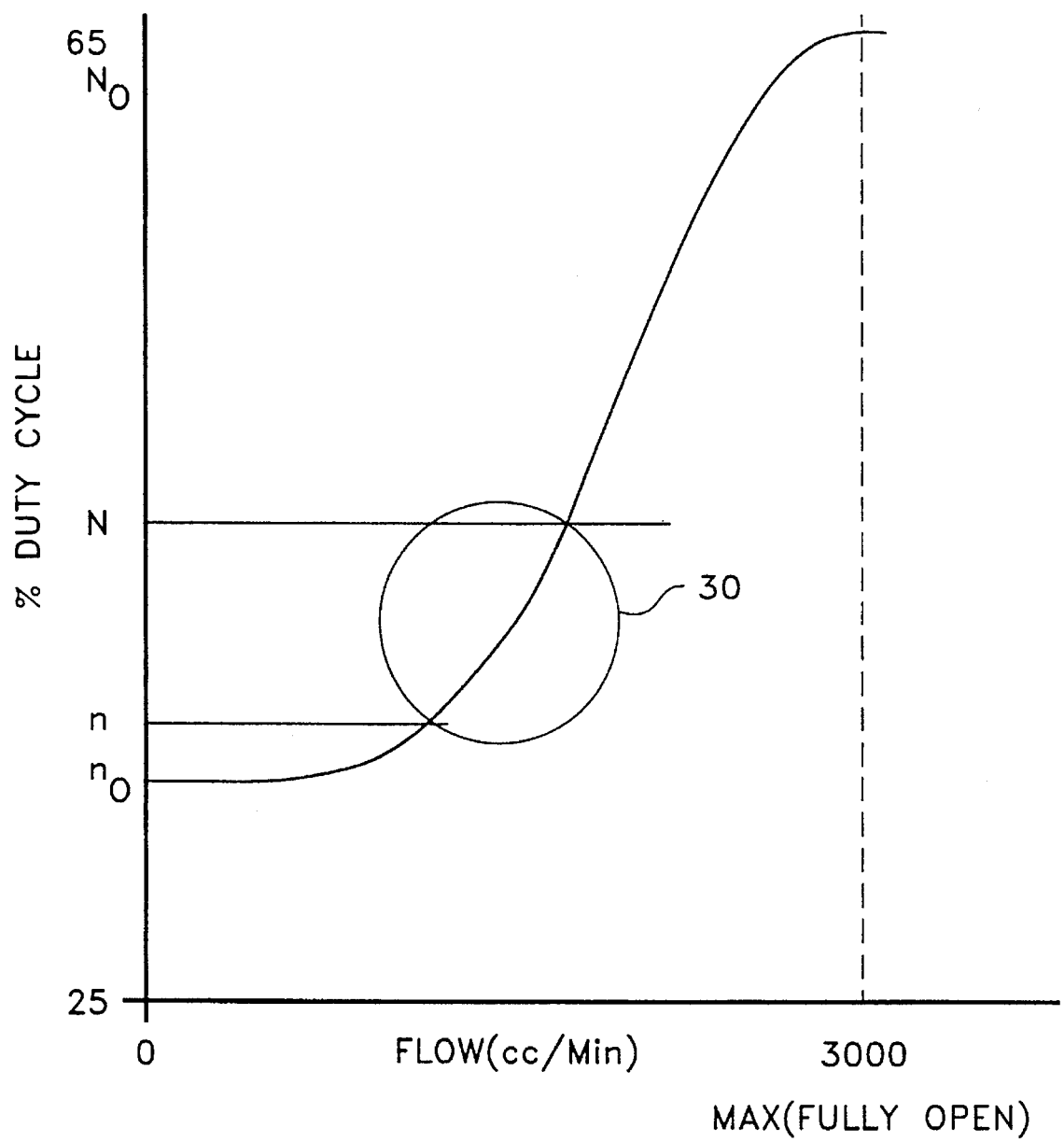
FIG. 3 shows a transfer characteristic of a typical solenoid valve.
Figure 4:
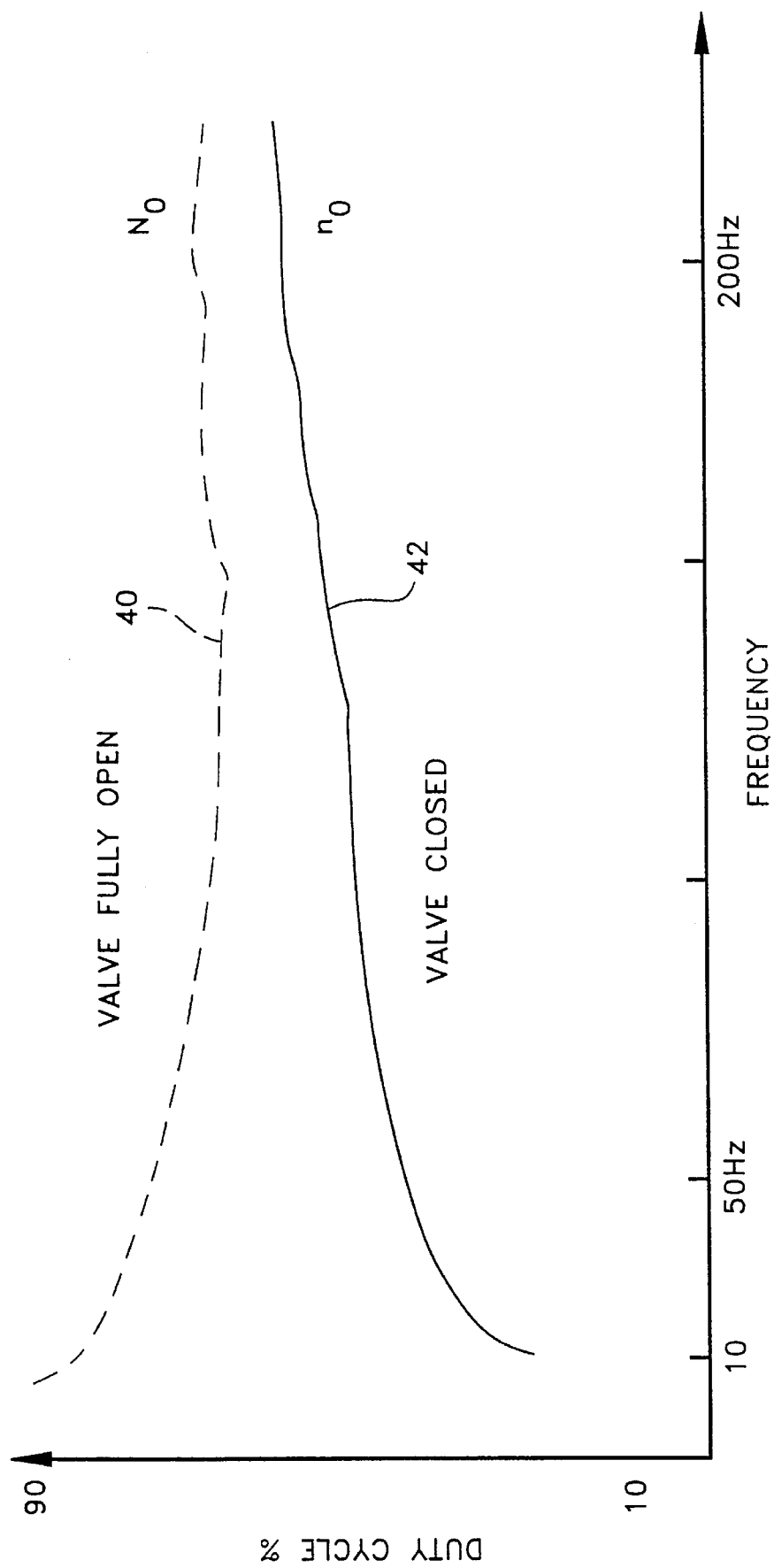
FIG. 4 shows how the envelope of the transfer characteristic of a solenoid valve varies with the frequency of the pulse width modulation signal.
Figure 5:
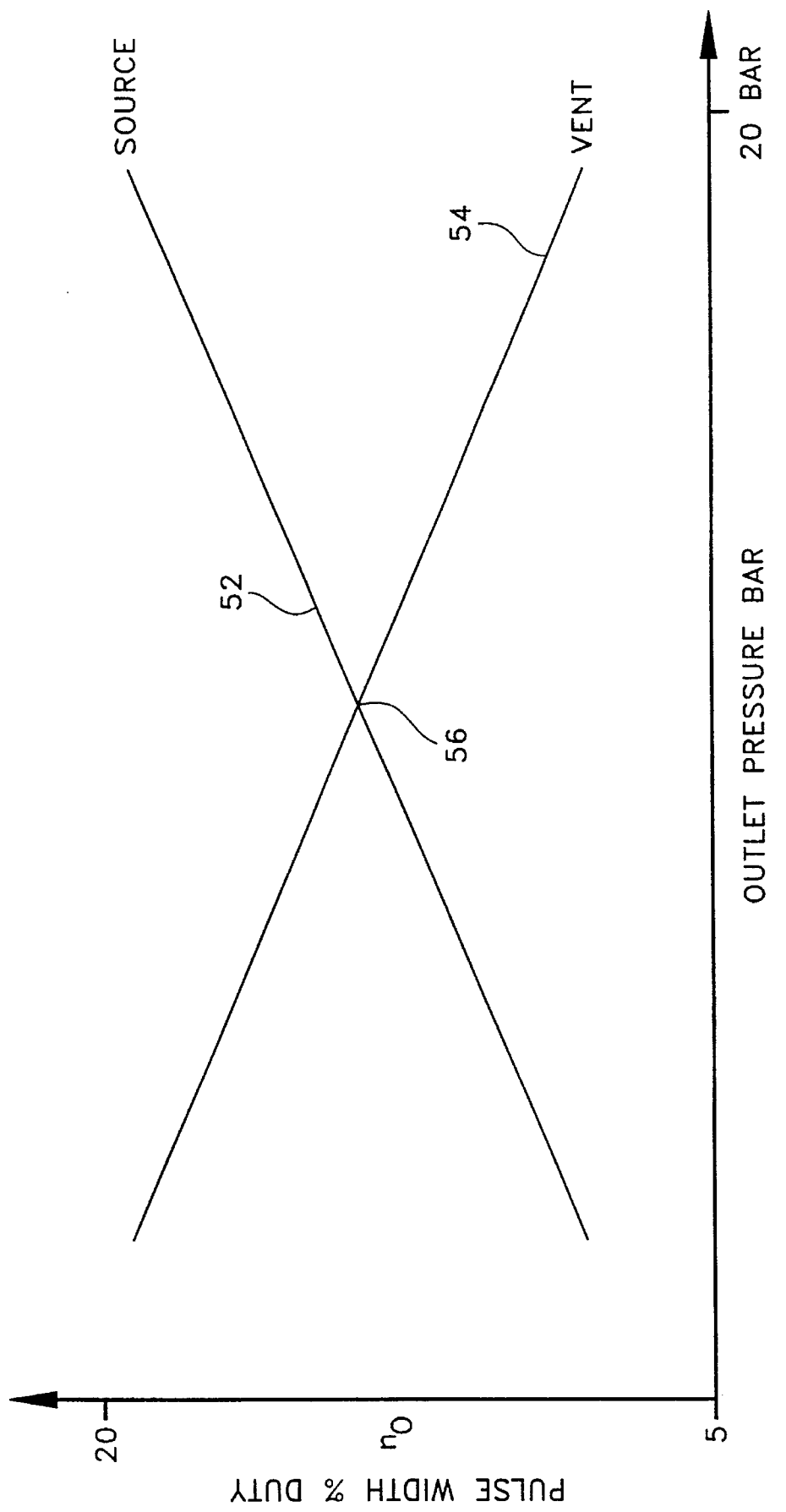
FIG. 5 shows a typical bias characteristic of apply and release solenoid valves working with a source at 25 bar and a 24 v excitation signal as used in a pressure controller in the form of a plot of the value of $n_o$ against pressure for each valve.

FIG. 5 shows how the value of $n_o$ varies across the range of the set outlet pressure. This variation is known as the bias characteristic of the valves. Plot 52 represents the release valve bias characteristic and plot 54 the apply valve bias characteristic. The point 56 at which the lines cross represents the outlet pressure midway between the source and vent pressures. Biasing techniques as used in the prior art, which selected only one bias setting for both valves inevitably resulted in over or under biasing, depending on whether the set pressure is greater or less than the pressure at which the characteristics cross.

Figure 6:
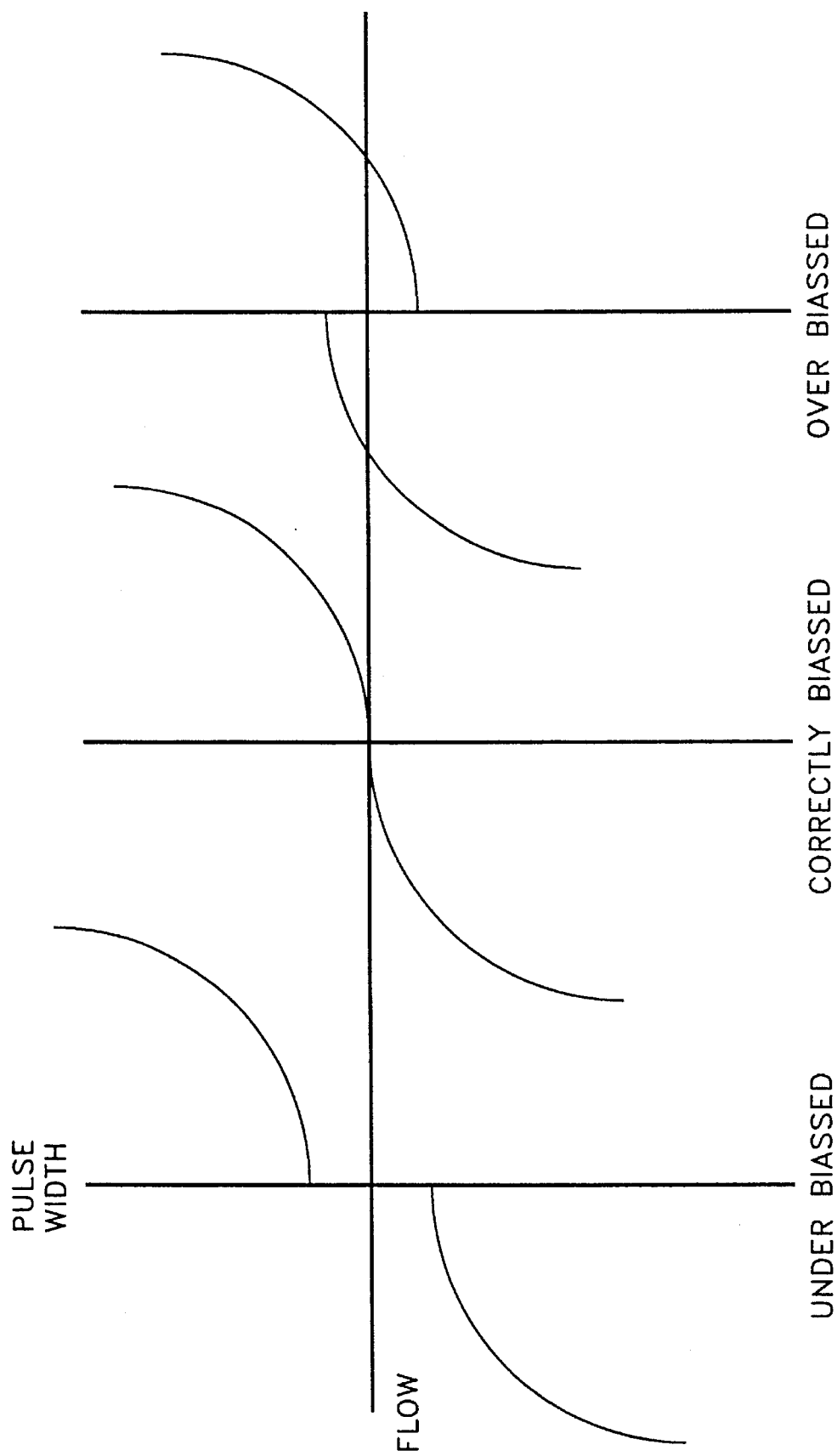
FIG. 6 shows three plots of flow through a solenoid valve as against an error voltage showing the affects of under bias, correct bias and over bias of the valve.

FIG. 6 illustrates the effect on flow of under biased, correctly biased and over biased apply and release valves. The vertical axis represents the value of the pulse width modulation signal actually applied to a control input of the valve, less the actual bias value. The upper part of the plot represents the transfer characteristic of the apply valve and the lower part of the plot represents the transfer characteristic of the release valve. In prior art types of controllers incorporating an analogue feedback loop as discussed in the introduction to this specification, the vertical axis would represent the voltage output of the error amplifier.

It will be noted from the left-hand plot that if the valves are under biased, a significant deviation from the set outlet pressure will be required before correcting flow appears at the outlet port to bring the pressure back to the set pressure.

As shown in the centre plot, where the valves are correctly biased, any deviation from the set pressure results in a corrective action.

As shown in the right hand plot, if the valves are over biased then, small deviations of the pressure below the set pressure will cause both apply and release valves to be actuated. Not only does this result in a waste of source gas but may, depending on the actual flows through each valve, result in a further reduction in pressure at the outlet port rather than the desired increase. Only when deviation between the outlet pressure and the set pressure reaches a significant value, will the release valve be closed and the apply valve opened so that the pressure can, once again, be restored to the set value. This type of behavior clearly limits the stability of the controller. Since prior art controllers are generally set so that over at least part of the range the valves are under biased, this is responsible for the limited stability possible with these types of controller.

In accordance with the present invention, the analogue feedback loop of the prior art is dispensed with altogether in favor of a digital feedback loop in which the bias of the valves can, effectively, be made differential pressure dependent.

Figure 7:
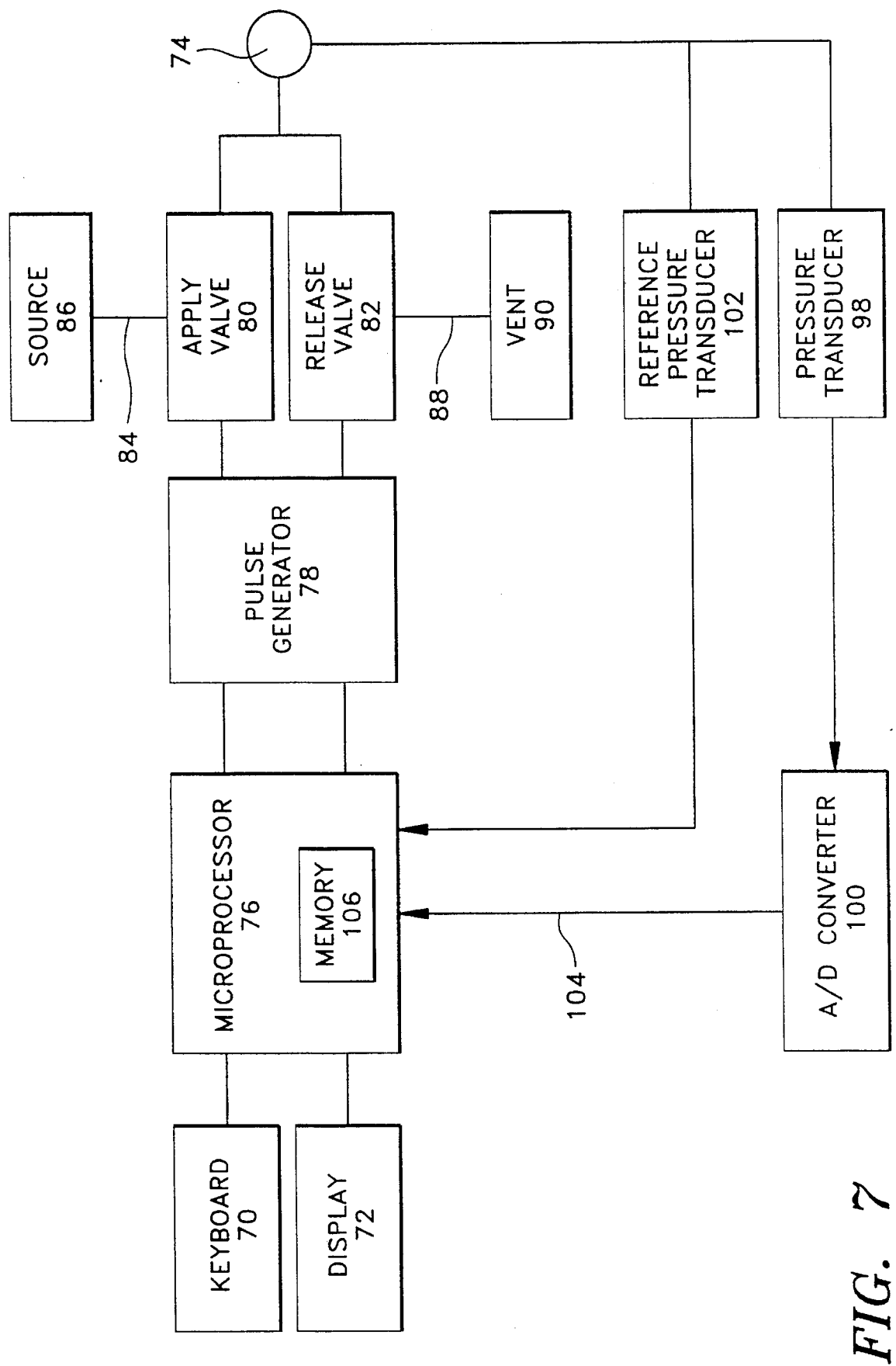
FIG. 7 shows a block diagram of an embodiment of a pressure controller in accordance with the present invention.

The layout of one embodiment of a pressure controller in accordance with the invention is shown in FIG. 7. The instrument is contained in a housing which is provided with an input device, 70, for instance a keyboard or a light pen interactive display, and a display 72, for example, a liquid crystal display. The input device 70 allows the user to enter the exact pressure which the user wishes to maintain at an outlet port 74. The input device 70 can also be used to allow the user to control the instrument in various other ways, such as, for example, initiating offline calibration of the controller, or selecting a particular range of output pressure. A keyboard and display are simply one method of providing a user interface and other arrangements may be employed such as a touch screen for providing input or pre-set switches for input. The display could be dispensed with altogether.

The keyboard and display are both connected to a processor 76 comprising a microprocessor circuit board which carries processing means and associated memory 106 containing a stored program for controlling the operation of the controller and stored bias characteristics of the apply and release valves.

The principal function of the stored program is to control a pulse generator 78 connected to the processor. The pulse generator 78 is effectively a timer which generates pulse width modulation signals of the appropriate value. The pulse generator 78 has two outputs which are connected respectively to control inputs of an apply valve 80 and a release valve 82. These valves 80, 82 are of the solenoid type described with reference to FIG. 1 in the introduction to this specification. An inlet port 84 of apply valve 80 is adapted to be connected to a source 86. Except where the controller is intended to be a portable instrument, the source 86 will be an external source of pressurized gas, such as a compressed air cylinder. An outlet port 88 of release valve 82 is connected to a vent 90, which would typically be open to atmosphere or connected to a vacuum pump when generating negative pressures relative to atmosphere. An outlet port of apply valve 80 and an inlet port of release valve 82 are connected to a common manifold 92 which is, in turn, connected to the outlet port 74 via an isolation valve 96 (see FIG. 8). The use of a manifold 92 and isolation valve 96 is one embodiment of isolating means. It would also be possible to isolate the valves independently so that they may be subjected to predetermined differential pressures. The manifold 92 is a convenient means of interconnecting the inlet port of the release valve but other interconnecting means may also be employed.

The pressure in the manifold 92 is, in normal operation of the controller with the isolation valve open, the pressure at the outlet port 74. This pressure is coupled to a pressure transducer 98. The pressure transducer 98 must be capable of responding quickly to fluctuations in pressure at the outlet port 74 in order to be able to provide effective control. For this purpose, it has been found preferable to use an analogue transducer which has its output connected to an analogue to digital (A/D) converter 100. A transducer producing a direct digital or frequency output could also be employed. The output of the A/D converter 100 is fed to the processor 76 to close a digital control loop.

A second pressure transducer 102 is preferably also connected in parallel with the fast pressure transducer 98. Because the pressure transducer 98 should have a fast response time to ensure stability and acceptable dynamic performance, it will tend to suffer from poor long term stability of calibration. If this is the case, the second pressure transducer 102 may be employed as a reference. This second pressure transducer 102 may continuously sense the outlet pressure or may be caused to sample this pressure at specific times using a valve controlled by the instrument processor 76. In this way the output of the slow but stable second pressure transducer 102 may be used to periodically calibrate the fast but less stable transducer 98 within the control loop. The result of using this combination of transducers is to gain a fast response time whilst maintaining good long term stability.

The processor 76 operates to compute a set point value from the user's input of the desired pressure. This set point value is then compared in the processor 76 with the actual pressure at the outlet port 74 as indicated by the input signal on line 104 from the A/D converter 100. The difference between the user determined set point and the signal representing the actual pressure on line 104 represents an error signal which can be used in a predetermined manner, as coded into the stored program, to determine the value of the pulse width modulation signals to be applied by the pulse generator 78 to either the apply valve 80 or the release valve 82.

Initially the error signal will be large and it will be necessary to fully open one or other of the valves and close the other. The fully open state is achieved by applying to the control input a pulse width modulation signal of at least value $N_o$ and the fully closed state by applying no signal or a signal of value less than $n_o$ to the control input. When the error signal is reduced, then it is necessary to operate the apply or release valve in its proportional mode so that the response at the outlet port 74 to a small positive or negative error signal is as illustrated in the centre plot of FIG. 6. The present pressure controller achieves this by storing within the processor 76 or in associated memory 106 the necessary values of $n_o$ for the individual apply and release valves which are contained within the controller for a range of pressures. Therefore, the processor 76 can select the appropriate value of $n_o$ which corresponds to the pressure set by the user or the present differential pressure across the controlled apply valve 80 or release valve 82. If the error signal indicates that the pressure at the outlet port 74 is less than the user set pressure, the microprocessor will cause the pulse generator 78 to apply a pulse width modulation signal to the apply valve 80 which exceeds the $n_o$ appropriate to that pressure by an amount dependent upon the magnitude of the error signal. Similarly, the pulse generator will apply a control signal to the release valve 82 which is reduced below $n_o$ so that that valve remains closed to allow the pressure at the outlet port 74 to increase. If the error signal indicated a pressure at the outlet port 74 that exceeded the pressure set by the user, then it would be the release valve 82 that was required to be operated. As the outlet pressure converges towards the set pressure, the flow through the appropriate valve is reduced in order to prevent over or under shoot of the set pressure and achieve rapid stabilization. The digital feedback loop described will also rapidly bring the pressure at the outlet port back to the set pressure if it deviates because of temperature fluctuations or because of leakage in the system to which the outlet port 74 is connected.

In order that the digital control loop described can operate effectively, it is necessary for there to be a calibration step. This will now be described. The initial calibration step is carried out at manufacture time and can be repeated off-line and, if necessary, can be repeated periodically. During this calibration step the bias characteristics of the type shown in FIG. 5 are measured. During calibration the isolation valve 96 is closed.

The calibration step of the pressure controller is carried out under the control of a stored program contained in memory 106, which may be in the processor 76. The calibration step may be selectively run under user control from the keyboard 70. The characteristics of each valve are determined in turn. Therefore, when the apply valve 80 is being characterized, no control signal will be applied to the release valve 82 so that it remains biased closed. The controller is first loaded with default bias data adequate to give rough control. Using this untuned controller, the manifold pressure is raised to the first pre-determined pressure and then a pulse width modulation signal of a value known to be below $n_o$ is applied by the processor 76. The processor 76 controls gradual increments in the value of the pulse width modulation control signal applied to the valve until the transducer detects an increase in pressure in the manifold, indicating that the valve has started to open. A value of $n_o$ for the corresponding differential pressure is stored in the memory 106 for further use. As in the case of normal operation, it is necessary to reject temperature induced pressure variations. These real changes in manifold pressure brought about by gas expansion/contraction can interfere with detecting the very small pressure changes just as the valve starts to open. Rejection of these other pressure changes may be achieved by using only gradual pressure steps and by careful analysis of the pressure signal from the manifold for responses or trends which do not correlate with pulses applied to the valves.

The calibration step is then repeated for the same valve for a series of pre-determined pressures. In order to establish the essentially linear characteristic, at least two pressure measurements within the range must be made. However, it is preferable to carry out more characterisation measurements for each valve, for instance, eight measurements, to obtain the best fit characteristic. The release valve 82 is then characterized in the same way, except that the value of $n_o$ will be indicated by a drop in the pressure in the manifold.

Using the present process of calibration, it is possible to calibrate accurately a pressure controller within approximately 5 minutes. No skill and no test equipment are required.

Although the factory characterisation should remain valid for a significant operating period, the bias characteristics will vary over time because of wear in the valve seat 6 and orifice 8 which will result in an originally correctly biased valve becoming over or under biased.

It is possible to make the controller sensitive to deficiencies in its calibration so that the need for re-calibration can be indicated to the user. The accuracy of the bias of the controller will be apparent from the stability of the controlled pressure. If the controlled pressure starts to fluctuate as measured by the pressure transducer 98, this will generally be due to the valves being either under or over biased. Re-calibration may also be necessary where the source or vent pressure is changed as the bias characteristic is a function of differential pressure.

Although each valve characteristic will be slightly different depending, for example, on the strength of the return spring 4 and the relationship of the valve seat 6 and orifice 8, the bias characteristic as measured as described is always found to be repeatable.

Since it is differential pressure which governs the bias characteristic, highest output stability is obtained if the source pressure is measured and any changes in source pressure used to adjust the value of $n_o$ used at any moment. This is achieved by measuring the source pressure with a transducer to determine the true differential pressure. The corresponding value of $n_o$ can then be determined arithmetically based on the stored bias characteristic and used to select appropriate control signals. Corresponding control methods can be used to adjust for fluctuations in the vent pressure. However, generally the greater source of pressure variability will reside with the source pressure.

It will be appreciated that other analytical methods may be used to process the signal from the pressure transducer 98 in order to determine the accuracy of the bias and apply suitable corrections to enhance the stability of the pressure controller.

A further preferred, but optional, feature of the pressure controller allows on-line updating of the valve bias characteristics during use of the pressure controller. An opportunity is available to measure $n_o$ for any user set pressure while the controller is operating. The actual measured value of $n_o$ may have been found to differ from that stored in the microprocessor from the last calibration step. If so, the value for that set pressure can be updated in the memory storing the valve bias characteristic. Because a deviation from the valve bibs characteristic could be due to noise, temperature variations or some cause other than one indicative of a general shift of the bias characteristic, it is desirable not to alter the stored values for pressures other than that at which the on-line measurement was made.

Various techniques may be employed for establishing the accuracy of valve biasing during on-line operation of the pressure controller. For example, the microprocessor may be programmed to carry out a statistical analysis of the variability of the controlled pressure. This statistical analysis could also be used to indicate the need for re-calibration. If the stability deviates from pre-set limits, then an immediate on-line adjustment to the bias calibration at that pressure point may be carried out. Fluctuations in stability may be due to any one of four factors, the shifting of $n_o$ for the apply valve either up or down or the shifting of the $n_o$ for the release valve 82 up or down. It is necessary to have a sufficiently fast statistical processor in order to create an effective algorithm which will determine which of the four factors is responsible for the stability fluctuation.

Another potential method for measuring $n_o$ on-line is to detect the very small ripple which is placed on the outlet pressure when a valve commences opening. This ripple will be at the frequency of the pulse width modulation signal which is a fixed and known quantity, say 65 Hz. The ripple is caused because opening of a valve arises by an oscillation of the core in the valve seat. By using pulse width modulation signals of different frequencies for the apply valve 80 and release valve 82, it is possible to distinguish ripple generated by the opening of each valve. This may be done by filtering the output of the A/D converter 100 at the frequencies of the respective pulse width modulation signals or processing that signal through a fast fourier transform processor. An alternative method of distinguishing the ripple generated by the apply valve 80 and release valve 82 is to offset the pulse width modulation signals applied to each valve from one another and use the pulse width modulation signal for each valve as a gating signal on the output of the A/D converter 100 in order to differentiate ripple generated by each valve, a form of synchronous detection.

The amplitude of the ripple signal indicates the magnitude of the flow through the valve. Typically, the maximum amplitude of ripple expected as the valve opens would be about −110 dB of full-scale. If the amplitude is found to exceed that value when a control signal corresponding to the stored $n_o$ is applied, then this would indicate that the $n_o$ stored for that pressure was too high and the value should be re-set lower to restore the correct bias.

I claim:

1. A pressure controller having a source port, vent port and outlet port comprising:

selection means permitting a user to select a pressure to be maintained at the outlet port;

apply and release valves for regulating gas flow, each valve having an inlet and an outlet and a control input for receiving pulse width modulated control signals; the apply valve inlet being adapted to be connected to a source of pressurized gas, the apply valve outlet being connected to the source port, the release valve inlet being connected to the vent port, and the release valve outlet being adapted to be connected to a vent;

a pressure transducer connected to the outlet port and adapted to generate a digital signal representing the pressure;

processor means connected to the pressure transducer and selection means, and adapted to generate control signals to the apply and release valves;

valve characterization means for calibrating the controller by independently determining $n_o$ for each valve for at least two predetermined pressures within the range of the controller; and means for storing the calibration $n_o$ values in the processor means for use by said processor means in generating control signals during operation of the controller;

wherein each pulse width modulated control signal has at least one period, each period having one pulse, the pulse being measured as a percentage of the period, and wherein $n_o$ is the percentage of the pulse width modulated control signal received at an individual valve at which gas flow is initiated.

2. The pressure controller of claim 1 further comprising means for isolating the apply valve outlet and the release valve inlet from the outlet port.

3. The pressure controller of claim 2, wherein the isolating means comprises means for interconnecting the apply valve outlet and release valve inlet and means for isolating the interconnecting means.

4. The pressure controller of claim 3, wherein the interconnecting means comprises a fluid-tight common manifold to which the apply valve outlet and the release valve inlet and the outlet port are connected.

5. The pressure controller of claim 1, wherein the pressure transducer comprises an analogue pressure transducer connected to an analogue to digital converter.

6. The pressure controller of claim 1, further comprising a second reference pressure transducer adapted to generate a digital signal representing the pressure, connected in parallel with the first pressure transducer.

7. The pressure controller of claim 6, wherein the same processor means is connected to the second transducer, and wherein the processor comprises a means of recalibrating the first transducer based on the output of the second transducer.

8. The pressure controller of claim 1, further comprising means for measuring the pressure of the source and generating a digital signal representing the source pressure to which the controller is connected and means for feeding said source pressure signal to said processor means.

9. The pressure controller of claim 8, wherein the processor means further comprises means of adjusting the values of $N_o$ for each said valve in the characterization storing means in light of changes in the output of the source pressure measuring means, and wherein $N_o$ is the minimum percentage of the pulse width modulated control signal received at an individual valve at which the valve is fully open.

10. The pressure controller as claimed in claim 1, further comprising means for analyzing the digital signal from the first pressure transducer to determine variations in stability of the pressure at the outlet port indicative of incorrect biasing of either valve.

11. The pressure controller of claim 1, comprising said processor means adapted to generate control signals for the apply and release valves having different frequencies.

12. The pressure controller of claim 1, comprising said processor means adapted to generate control signals for the apply and release valves that are out of phase relative to one another.

13. The pressure controller of claim 1, further comprising means for permitting a user to initiate off-line calibration of valve bias characteristics.

* * * * *